United States Patent [19]

Mukai

[11] 4,217,242

[45] Aug. 12, 1980

[54] PROCESS FOR PREPARING AN IMPROVED ANTI-OXIDANT GUM COMPOSITION FOR LITHOGRAPHIC PLATES

[75] Inventor: Cromwell D. Mukai, Berkeley Heights, N.J.

[73] Assignee: Polychrome Corporation, Yonkers, N.Y.

[21] Appl. No.: 921,697

[22] Filed: Jul. 3, 1978

[51] Int. Cl.² .................... C09K 15/32; C23F 11/16; B41C 1/10
[52] U.S. Cl. ................... 252/389 A; 430/202; 430/302; 96/29 L; 96/33; 101/466; 106/14.12; 106/208; 148/6.15 R; 422/12; 422/13; 252/389 R; 252/400 R; 252/400 A

[58] Field of Search ............ 252/389 A, 81 A, 400 A, 252/400 R, 389 R; 106/14.12, 14.14, 14.21, 208, 14.35, 14.38, 14.39; 101/466; 210/58; 96/29 L, 33; 148/6.15 R; 422/12, 13

[56] References Cited

U.S. PATENT DOCUMENTS

| | | | |
|---|---|---|---|
| 2,395,654 | 2/1946 | Brannigan et al. | 106/208 |
| 2,589,313 | 3/1952 | Wood | 106/208 |
| 2,950,195 | 8/1960 | Hodgins et al. | 106/208 |
| 3,615,791 | 10/1971 | Thomas et al. | 106/208 |
| 3,679,479 | 7/1972 | Ray et al. | 252/143 |

*Primary Examiner*—Benjamin R. Padgett
*Assistant Examiner*—Irwin Gluck

[57] ABSTRACT

Provided is a process for preparing an improved gum formulation useful for preventing oxidation in exposed and developed lithographic printing plates. The gum so produced exhibits reduced foaming and air entrapment properties.

6 Claims, No Drawings

PROCESS FOR PREPARING AN IMPROVED ANTI-OXIDANT GUM COMPOSITION FOR LITHOGRAPHIC PLATES

SUMMARY OF THE INVENTION

This invention is concerned with an improved gum composition for preventing oxidation and deterioration of exposed and developed lithographic printing plates.

It is well known in the art to coat the surface of exposed and developed aluminum based lithographic printing plates with a water soluble gum composition, particularly aqueous gum arabic so as to prevent the formation of aluminum oxide due to the exposure of bare aluminum surfaces to the air. However, there are several disadvantages to the use of gum arabic for this purpose. A gum arabic solution entraps air and demonstrates excessive foaming especially in automatic developing machinery. This prevents the efficient application of gum to a plate surface.

Unprocessed gum arabic solution does not spread uniformly when applied but has a streaked surface when applied to the plate. Also, the gum has to be rubbed dry whereas with the product of this invention, the excess may be merely drained off and the printer does not have to spend excessive time rubbing a plate dry. Such a thick coating of untreated gum arabic is not easily dried and is difficult to remove once a stored plate is eventually to be used for printing. One cannot merely dilute the gum arabic to a less viscous form since this also reduces its anti-oxidizing properties.

Another problem of using unprocessed gum arabic is that in many instances it causes "blinding" or spots where the image area would not take ink. This results from the accumulation or piling of gum on the image area causing a glazed surface which does not take ink. The product of the invention avoids these problems and is capable of easy removal before press operation.

The instant invention therefore prevents blending and also protects the surface of the plate (both image and non-image areas) before going to press. It effectively prevents chemical changes, on the aluminum surface, which would result in ink getting on to non-image areas. This product works as well with automatic processors as it does in hand operations.

The present invention solves the above mentioned problems by providing a gum arabic treatment which produces a highly free flowing, relatively thin liquid which is easy to apply, dry and remove, demonstrates reduced air entrapment propensities and is capable of effectively protecting a lithographic printing plate from air oxidation with a uniform coating free of streaks.

DETAILED DESCRIPTION OF THE PREFERRED EMBODIMENT

As hereinbefore mentioned, the instant invention relates to a process of making an improved gum for protecting lithographic printing plates from atmospheric elements. The produced gum overcomes the high viscosity and consequential foaming problems encountered in employing such gums for lithographic purposes. The method comprises the steps of, 1. Blending a solution of aqueous gum arabic with a mineral acid so as to adjust its pH to 2.0 or less;
2. Heating the solution at a temperature which is less than its boiling point so as to obtain a viscosity of from about 1.5 to about 10 cps.;
3. Adjusting the pH to from about 3 to about 10.5 with sodium hydroxide;
4. Adding from about 1 to 2% of formaldehyde based on a 37% formaldehyde solution;
5. Adding from about 0.01 to about 1.0% of a compatible surfactant capable of reducing the surface tension of the composition to about 20 to 35 dynes per centimeter at room temperature; and
6. Filtering out suspended particles.

It is preferred that the starting material comprise an aqueous solution of gum arabic having a concentration of up to about 25% by weight. More preferably the concentration is from about 5 to 15% and most preferred is a concentration of from about 8 to 10%.

This aqueous gum arabic solution is then treated with sufficient acid, preferably a mineral acid, such as sulfuric, hydrochloric, phosphoric, or hydrobromic acid so that the pH of the resultant mixture is less then 2.0. The most preferred of this group is phosphoric acid.

This acid treated gum arabic solution is then heated at a temperature just below its boiling point, preferably at 85 to 99 degrees C. at atmospheric pressure for a time sufficient to bring the mixture to a viscosity of from about 1.5 to about 10 centipoises and preferably from about 1.8 to about 2.2 centipoises. The mixture is then adjusted to a pH of from about 3 to 10.5, and preferably 4.5 to 4.7 by a compatible basic material such as alkali hydroxide and preferably sodium or potassium hydroxide.

The resultant composition is then treated with a preservative, preferably formaldehyde in an amount equivalent to from about 0.1 to 2% of a 37% formaldehyde solution. Added to this resultant product is a sufficient amount of a compatible surfactant so as to reduce the surface tnesion of the end material to from about 20 to 35 dynes per centimeter at room temperature. Typical of such surfactants include dioctyl sodium sulfosuccinate, polyethoxylated alkyl phenols, sodium lauryl sulfate, polyhydroxylated sorbitan monolaurate and potassium perfluoroalkylcarboxylate available commercially as surfactant FC128 from the Minnesota Mining and Manufacturing Company. Typical amounts of such surfactants range from about 0.01% to about 1% and preferably from 0.01% to 5% by weight of the end product material.

This material is then separated of its suspended particles by methods such as periodic decanting of supernatant fluids, filtering and blending with diatomaceous earth (available commercially as Celite 535) with subsequent filtering.

The thusly produced fluid has demonstrated superior printing plate protection properties with ease of application, drying and removal with a substantial reduction in foaming as compared to a similarly concentrated aqeuous gum arabic solution without the aforementioned processing.

The following examples serves as a non limiting demonstration of the instant invention.

EXAMPLE 1

8.26 g of gum arabic, 90.25 g of water and 0.59% of phosphoric acid (85%) are mixed together and heated to 98 degrees C. with stirring for about 20 hours until its viscosity reaches 2.0 centipoise. The mixture is then neutralized to a pH of 4.5 with 0.27 g of 10 N sodium hydroxide. To this was added 0.59 g of formaldehyde (37%) and 0.05 g of surfactant FC128 (available from 3 M). This mixture was then blended with sufficient Celite 535 to allow filtration of the suspended particles. The filtered fluid was applied to a typical lithographic printing plate which was thereby protected from oxidation for a one week period. At the end of this one week period, the gum was easily removed from the surface of the plate which produced clean, commercially acceptable reproductions.

It is, of course, to be understood that the foregoing description may be variously altered in its ingredients and proportions without departing from the true scope and spirit of the invention.

What is claimed is:

1. A method of producing a gum composition capable of effectively preventing the oxidation of aluminum surfaces under ambient atmospheric conditions which comprises the steps of,
   a. blending an aqueous solution of a gum arabic with a mineral acid so as to obtain a pH of about 2.0 or less;
   b. heating the solution at a temperature just below its boiling point until a viscosity of from about 1.5 to about 10 centipoises is obtained;
   c. elevating the pH to from about 3 to about 10.5 with a compatible base material;
   d. adding a suitable preservative composition;
   e. adding a compatible surfactant;
   f. removing suspended particles from the mixture.

2. The method of claim 1 wherein the mineral acid is phosphoric acid.

3. The method of claim 1 wherein the compatible base material is an alkali hydroxide.

4. The method of claim 1 wherein the suitable preservative material is formaldehyde.

5. The method of claim 1 wherein the surfactant is a composition selected from the group consisting of dioctyl sodium sulfosuccinate, polyethoxylated alkyl phenols, sodium lauryl sulfate, polyhydroxylated sorbitan monolaurate and potassium perfluoroalkylcarboxylate.

6. The gum composition obtained by the method of claim 1, 2, 3, 4, or 5.

7. The gum composition obtained by the method of claim 1 wherein said aqueous gum arabic solution contains up to 25% gum arabic by weight.

8. The gum composition obtained by the method of claim 1 wherein said compatible base material is sodium hydroxide.

9. The gum composition obtained by the method of claim 1 wherein said mineral acid is selected from the group consisting of sulfuric, hydrochloric, phosphoric or hydrobromic acid.

10. The gum composition obtained by the method of claim 1 wherein the heating step is conducted at a temperature of from 85 to 99 degrees C.

11. The gum composition obtained by the method of claim 1 wherein,
   (i) said mineral acid is selected from the group consisting of sulfuric, hydrochloric, phosphoric or hydrobromic acid; and
   (ii) said compatible base material is an alkali hydroxide; and
   (iii) said preservative composition is formaldehyde; and,
   (iv) said surfactant is selected from the group consisting of dioctyl sodium sulfosuccinate polyethoxylated alkyl phenols, sodium lauryl sulfate, polyhydroxylated sorbitan monolaurate, and potassium perfluoroalkylcarboxylate.

12. The gum composition obtained by the method of claim 1 wherein said mineral acid is phosphoric acid; the compatible base material is sodium hydroxide; the preservative composition is formaldehyde and said surfactant is sodium lauryl sulfate.

13. The gum composition obtained by the method of claim 1 wherein said step (f) is conducted by blending the composition with diatomaceous earth with subsequent filtering.

14. The gum composition obtained by the method of claim 1 wherein said aqueous gum arabic solution contains up to 25% gum arabic by weight; said mineral acid is phosphoric acid; said compatible base material is sodium hydroxide or potassium hydroxide; said preservative composition is formaldehyde; said surfactant is sodium lauryl sulfate; and wherein said step (f) is conducted by blending the composition with diatomaceous earth with subsequent filtering.

* * * * *